Oct. 15, 1963  E. J. WORLEY  3,106,954
METHOD AND APPARATUS FOR PRODUCING SCREW CONVEYOR BLADES
Filed Oct. 30, 1959  3 Sheets-Sheet 1
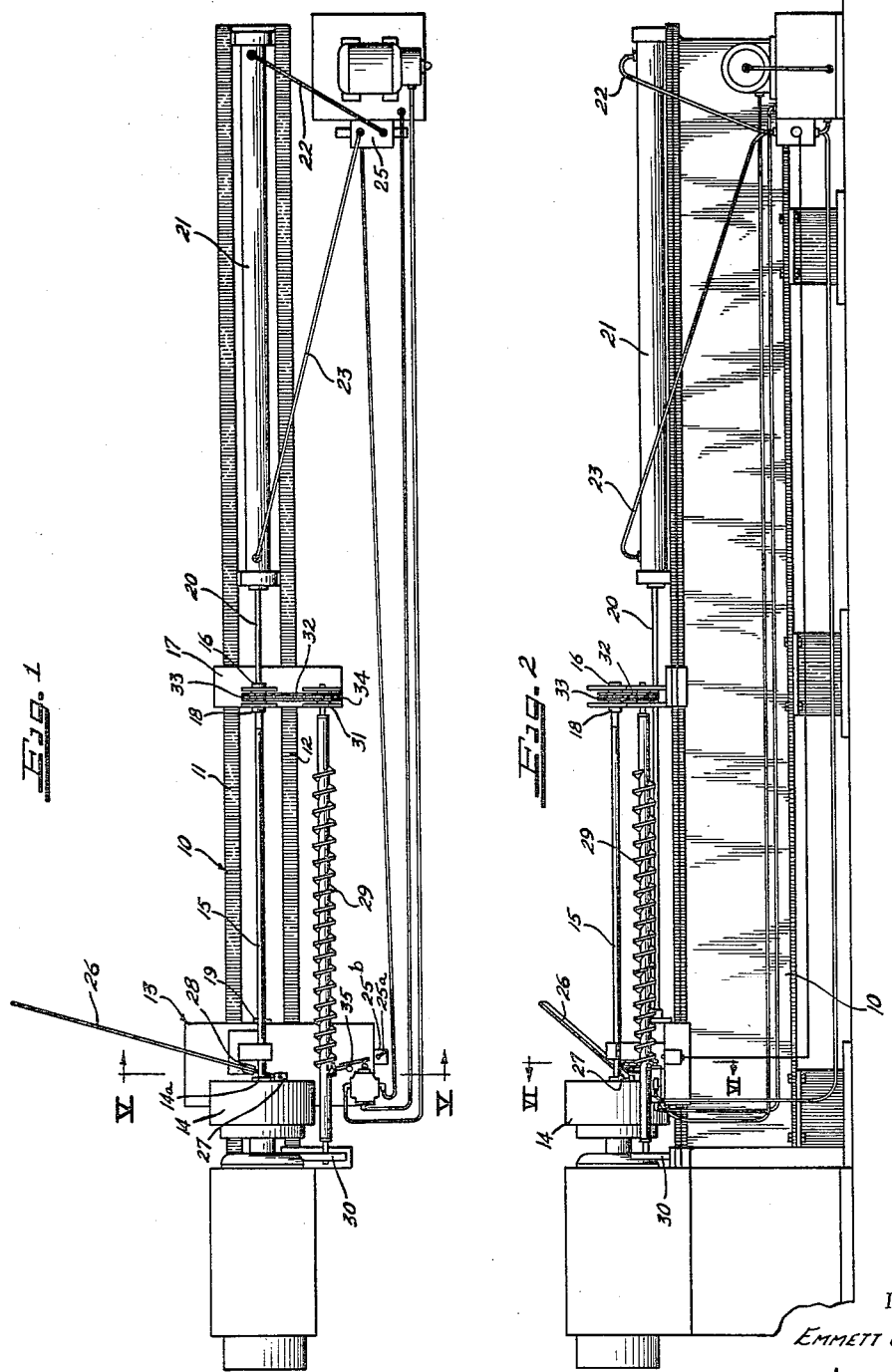
INVENTOR
EMMETT J. WORLEY
BY
ATTORNEY Oct. 15, 1963  E. J. WORLEY  3,106,954
METHOD AND APPARATUS FOR PRODUCING SCREW CONVEYOR BLADES
Filed Oct. 30, 1959  3 Sheets-Sheet 2
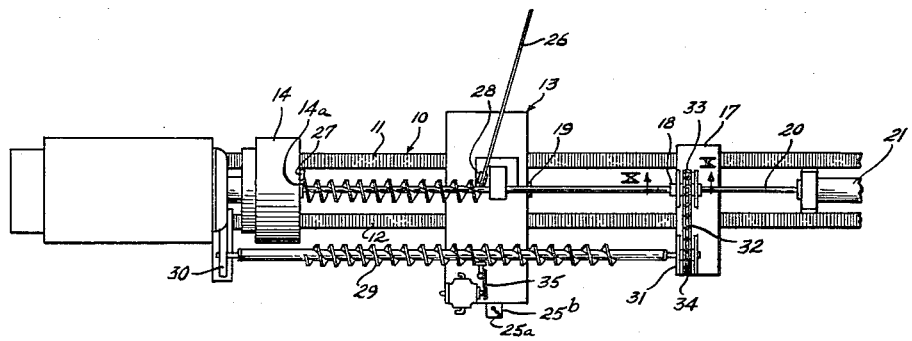
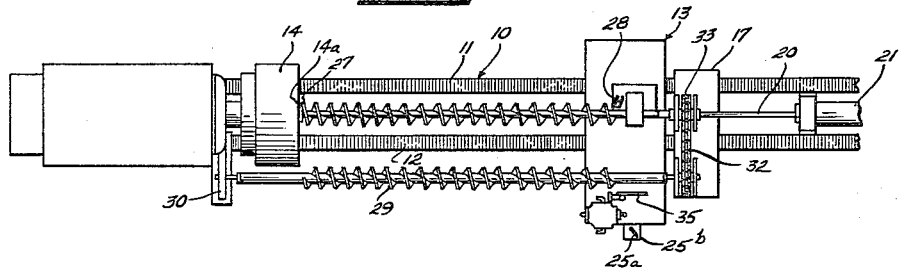
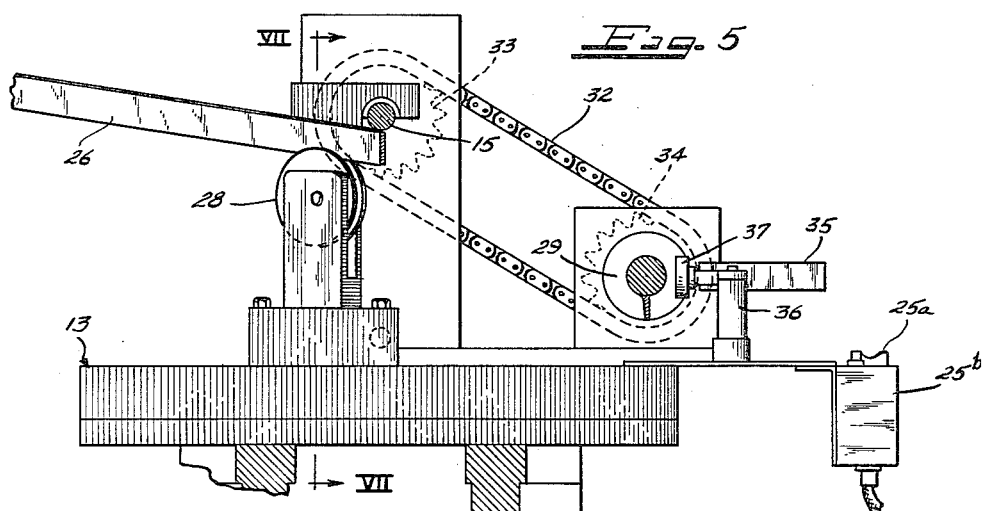
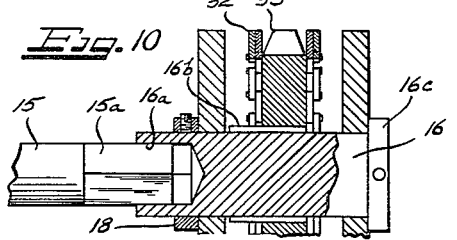
INVENTOR
EMMETT J. WORLEY
BY Stanley Hood
ATTORNEY

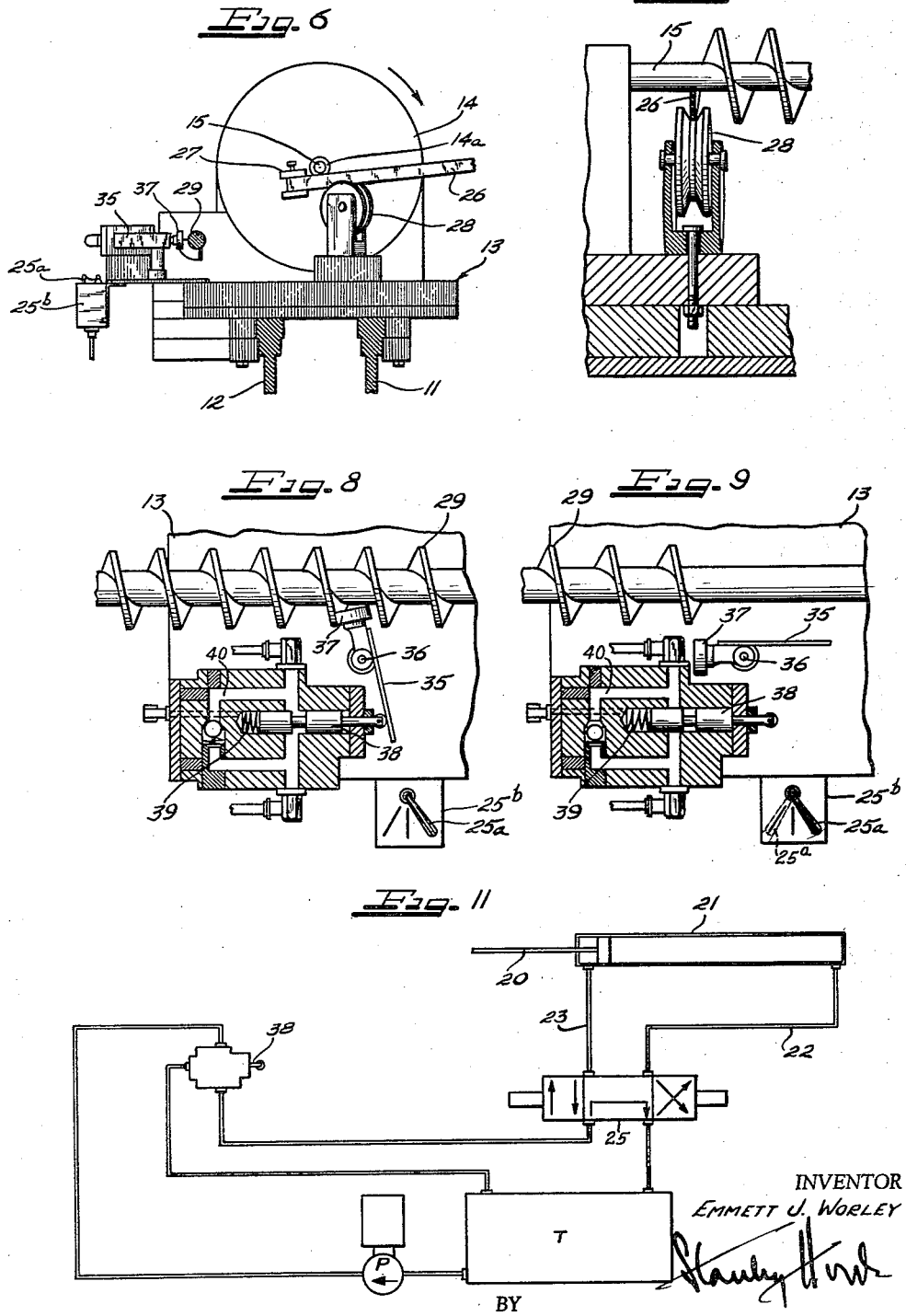

United States Patent Office 3,106,954
Patented Oct. 15, 1963

3,106,954
METHOD AND APPARATUS FOR PRODUCING SCREW CONVEYOR BLADES
Emmett J. Worley, Mount Prospect, Ill.
Filed Oct. 30, 1959, Ser. No. 849,896
2 Claims. (Cl. 153—64.5)

In the manufacture of conveyor screws it is common to roll a flat steel strip in special forming machines to produce a helical blade which is then slipped over a pipe or rod and thereafter welded to the latter. In certain installations it is necessary to provide a conveyor screw having variable pitch characteristics. In fuel conveyor screws for stoker fired heating units, for example, the pitch of the helical turns are lengthened in the direction of the discharge end of the screw so as to make proper allowance for congestion of fuel in the passage leading from the hopper to the retort in the combustion area. This has heretofore been accomplished by having selected flight areas of uniform pitch throughout each area with the pitch of one area at variance with the pitch of the next adjacent area with the result that a step marked the end of each area and the beginning of the next area. The present invention aims to provide for the production of conveyor screw blades having progressive variations in pitch characteristics to suit any desired condition and thereby eliminate the step marking each pitch condition.

Another object of the invention is to provide a machine by which a length of conveyor screw blade material is twisted into the shape of a helix in response to rotation of a mandrel to which one end of the blade material is fastened and directing the unfastened portion of the blade material toward the mandrel by means of a travelling guide movable along a fixed path in spaced parallel relation to the mandrel at a rate of travel in predetermined relation to the velocity of rotation of the mandrel to progressively vary the pitch of the turns of said blade material during rotation of the mandrel.

Another object of the present invention is to provide a machine of the character indicated wherein means for controlling the rate of travel in predetermined relation to the velocity of rotation of the mandrel to progressively vary the pitch of the turns of said blade material during rotation of the mandrel includes a revolving helical track member with which said travelling guide has interengagement while directing said unfastened portion of the blade material to said mandrel.

Other objects and advantages of the invention will in part be obvious and in part appear hereinafter from a consideration of the following detailed description.

Referring to the drawings accompanying the instant application for a detailed illustration of the machine, FIG. 1 is a top plan view of a machine embodying the present invention.

FIG. 2 is a side elevation thereof.

FIG. 3 is a fragmentary top plan view of the machine showing the screw blade material in process of production.

FIG. 4 is a similar view showing the product of the machine in finished condition.

FIG. 5 is an enlarged fragmentary view taken along line 5—5 of FIG. 1.

FIG. 6 is a fragmentary view taken along line 6—6 of FIG. 2.

FIG. 7 is a fragmentary detail view taken along line 7—7 of FIG. 5.

FIG. 8 is an enlarged detail view, with parts in section, showing the controls for regulating the rate of travel of the travelling guide in relation to the speed of rotation of the mandrel, while said controls are in operation.

FIG. 9 is a similar detail view showing the controls as they appear at the end of a cycle of operation.

FIG. 10 is an enlarged fragmentary view taken along line 10—10 of FIG. 3.

FIG. 11 is a diagrammatic illustration of the hydraulic system for controlling the action of the travelling guide.

Reference being had more particularly to the drawings, a machine illustrative of the apparatus of this invention, and which is useful in practicing the method of this invention, includes a stationary base 10 having a pair of spaced parallel ways 11 and 12 on which a traveler 13 is supported for sliding movement along a fixed path extending lengthwise of the base 10. A revolving head 14 is supported at one end of said ways 11 and 12 for rotation about an axis in spaced parallel relation to said ways. Reference numeral 15 designates a mandrel drivingly connected at one end thereof to the head 14 by means of a hinged coupling 14$^a$ for coaxial rotation in unison with the head 14. The projecting end of the mandrel is joined to a shaft 16 journalled in opposite upright arms of a bracket 17 fixed to the base 10. As shown in FIG. 10, a squared socket 16$^a$ provided in the end of shaft 16 receives a squared end portion 15$^a$ of the mandrel 15 to establish a driving connection between the shaft 16 and the mandrel 15. A collar 16$^c$ and a second collar 18 secured to the shaft 16 in straddling relation to the arms of the bracket 17 function to maintain the shaft 16 in proper axial position to retain the latter in such drivingly connected relation to the mandrel 15. The shaft may be freed for axial withdrawal from the mandrel by loosening a set screw on the collar 16$^c$. Thus the mandrel 15 is releasably linked to the shaft 16 for rotation in unison with the rotary movement of the head 14 along an axis in spaced opposed relation to the path of the traveler 13 on said ways 11 and 12. Rotation of the head 14 is effected by motor driven means having suitable selective speed gear mechanism cooperating therewith for controlling and regulating the speed as well as the direction of rotation of the head 14.

As further shown in the drawings, a detachable coupling 19 establishes a driving connection between the traveler 13 and a rod 20 extending into a hydraulic cylinder 21 mounted on the base 10 in alignment with the path of the traveler. The cylinder contains a piston (not shown) connected to the rod 20 which reciprocates within the cylinder under the influence of hydraulic fluid alternately supplied to the opposite ends of the cylinder by flexible fluid conduits 22 and 23.

A directional valve 25 (see FIG. 11) is operable between a first position and a second position under control of a valve operating lever 25$^a$ forming part of a valve operating unit 25$^b$ (see FIGS. 8 and 9) supported on the traveller 13 to establish flow of fluid to said opposite ends of the cylinder 21 from a source of pressure fluid, such as a pressure fluid tank T, a pump P and fluid lines connecting said valve 25 to said tank and said pump as shown in FIG. 11. When the lever 25$^a$ is in the position shown in FIG. 8, the line leading from the pump in a direction away from the tank feeds fluid to one end of the cylinder 21 via conduit 23 while fluid is discharged from the opposite end of the cylinder 21 through conduit 23 to the tank via valve 25. Such flow of fluid to the cylinder 21 via conduit 23 acts to retract the piston rod 20 causing the traveller 13 to be driven forwardly away from the head 14 along the ways 11 and 12. To return the carriage or traveller 13 from such forward position to a rearward position in the direction of the revolving head 14, lever 25$^a$ is moved clockwise to assume the dotted line position shown on the unit 25$^b$ in FIG. 9, whereby the fluid is fed from the pump to the other end of the cylinder 21 via conduit 22 while fluid is discharged from the other end of the cylinder via conduit 23 to the tank via valve 25. Such reversal of the flow of fluid via the valve 25 is accordingly effected to project the piston rod 20 from the cylinder 21 in the direction of the head 14 and the traveller is thereby moved from a forward position to a rearward position along the ways 11 and 12 to a starting position with relation to the head 14.

The work, such as a metal blank 26 in the form of a strip of suitable screw conveyor blade stock, is secured to the revolving head 14 by the clamping action of a holder 27 demountably fixed on the head 14. With the leading end of the blank 26 thus confined in the holder 27, as shown in FIG. 6, rotation of the head 14 in a clockwise direction causes the trailing portion of the blank 26 to become wound about the mandrel 15 in a succession of turns corresponding to the revolutions completed by the head 14. The traveler 13 is provided with a swivel guide 28 against which the trailing portion of the blank 26 bears downwardly while being dragged in the direction of the mandrel 15 to complete turns about the mandrel in accordance with the revolutions of the head 14. During such twisting of the blank 26, the traveler 13, under control of the valve 25 operated by the member 25ᵃ to direct fluid pressure to the cylinder via conduit 23 to retract the piston rod 20, is caused to be driven forwardly away from the head 14. In accordance with such movement of the traveler 13, the trailing portion of the blank 26 acting under stress applied by the guide 28 moving in unison with the traveler 13 is tensioned to develop a series of turns about the mandrel 15 having pitch and lead characteristics controlled by the rate of movement of the traveler 13.

A template control system, as hereinafter more particularly described, acts to regulate the flow of fluid pressure into the cylinder 21 via conduit 23. As shown in FIGS. 1 and 2, a template having a helical blade 29 of predetermined varying pitch characteristics is supported at opposite ends thereof in bearings 30 and 31 for rotation about an axis in spaced parallel relation to the path of the traveler 13. By means of a chain drive 32 acting via a driver sprocket 33 in coaxial driving engagement with splines on the shaft 16 linked to the mandrel 15 and a driven sprocket 34 in coaxial driving engagement with the template, the latter rotates in unison with and at a speed and direction of movement coinciding with the motion of the head 14. By virtue of this relationship between the template and the head 14, the template revolves on its bearings 30 and 31 simultaneously with the rotation of the head 14, and in response to such rotation of the template, as viewed in FIGS. 1 and 2, the turns of the template will lead a follower from left to right corresponding to the direction of movement of the traveler 13 in response to movement of the rod 20 toward the cylinder 21 under the influence of pressure admitted to the latter via conduit 23. Reference numeral 35 designates a tracer pivotally mounted on the traveler 13 as at 36 for swinging movement in opposite rotational directions along the line of movement of the traveler 13. A roller 37 at one swinging end of the tracer 35 rides the leading face of the turns of the template blade 29. The position of the opposite swinging end of the tracer 35 is accordingly established under pressure thus applied against the roller 37 at the surface of the template blade 29 engaged thereby as the template revolves in response to rotation of the head 14. A fluid flow regulator unit for adjusting the flow of fluid to the cylinder 21 via conduit 23 and valve 25 is provided with an actuator 38 which, as shown in FIGS. 8 and 9, moves between retracted and advanced positions to respectively open and close the line of fluid flow through conduit 23 in the direction of the cylinder 21, and is biased by a spring 39 to an advanced position. While the turns of the template blade 29 have engagement with the roller 37 at the first swinging end of the tracer 35, as shown in FIG. 8, the opposite end of the tracer occupies a position effective to overcome the force of the biasing spring 39 and thereby stress the actuator 38 toward a retracted position. As a consequence, the tracer 35 acts in response to variations in the pitch characteristics of the template blade 29 to automatically operate the fluid flow regulator whereby the rate of movement of the traveler 13 will accurately duplicate the rate of travel of the tracer 35 as determined by the pitch characteristics of the template blade 29. As the tracer 35 reaches the end of the template blade 29, the actuator 38 of the fluid flow regulator is free to assume its advanced position effective to stop the flow of fluid pressure to the cylinder 21 via conduit 23 whereby the traveler 13 is brought to a stop. It is to be noted from the details of the directional valve unit 25 and the fluid flow regulator actuator 38 as shown in FIGS. 8 and 9 that the passage which is opened and closed by the actuator is by-passed by a one-way fluid passage 40 to allow flow of fluid away from the cylinder 21 via conduit 23 when the valve 25 is motivated by operating member 25ᵃ to apply pressure to the cylinder 21 via conduit 22 and thereby cause the piston rod 21 to move in a direction to return the traveler 13 to a starting position with relation to the head 14.

The blank 26 having thus reached a completed state and the traveler 13 brought to a stop as indicated in FIG. 9, the mandrel 15 is released from the shaft 16 and lifted about the pivotal connection provided by the hinged coupling 14ᵃ to allow the finished blank 26 to be pulled off the mandrel 15 in the direction of the projecting end of the mandrel.

It is obvious that the condition of the turns of the template may be of various specific types to suit a desired condition. Thus for example, the turns may be arranged to rise from right to left instead of from left to right as viewed in the direction which the turns advance in FIGS. 8 and 9. In such event, the direction of movement of the head 14 and mandrel 15 and the template would be changed to move counterclockwise as viewed in FIG. 6 and the blank 26 would be guided toward the mandrel 15 along a route under the mandrel 15 rather than above as shown in FIG. 6. It will also be obvious that under certain conditions the rate of travel of the guide 28 in relation to the velocity of rotation of the mandrel 15 would be at variance with the ratio produced in accordance with the specific example shown in the drawings. Thus, the present invention provides for the accurate regulation of the speed of rotation of a revolving mandrel in relation to the rate of travel of a guide in which the unfastened portion of a metal blank is directed progressively toward the mandrel in a path lengthwise of the axis of the mandrel at infinitely varying ratios to enable the production of helical screw conveyor blades of stepless progressive variation in pitch characteristics.

What is claimed is:

1. A machine for producing a helical twisted blade from a linear blank of metal stock which includes a revolving head to which an end portion of said stock is adapted to be fastened, a mandrel fixed to and extending axially away from said head, a travelling guide supported for movement along a fixed path in spaced parallel relation to said mandrel toward and away from said head and through which guide the unfastened portion of said stock is continuously directed toward said mandrel in response to rotation of said head, a template having a helical blade, said template being supported for rotation about an axis in spaced parallel relation to the axis of said mandrel, means for rotating said template at a selected speed and in a direction conforming to the direction of rotation of said mandrel, fluid power transmitting means to which said guide is drivingly connected for moving said guide, said fluid power transmitting means including a conduit defining a line of fluid supply and a regulator in said line having an actuator projecting therefrom and movable between retracted and advanced positions along a line parallel to the path of said guide, and a tracer mounted on the guide supporting means for pivotal movement about an upright axis between the line of movement of said actuator and the line of motion of said template, said tracer having one end thereof engaging the leading end of said actuator and the other end thereof riding the leading face of turns of the template whereby the tracer is operable to control the rate of travel of the guide in accordance with the pitch characteristics of the turns of the template.

2. A machine for producing a helical twisted blade from a linear blank of metal stock according to claim 1 wherein said actuator is biased toward an advanced position and the template acts on said tracer to press said actuator toward retracted position.

References Cited in the file of this patent

UNITED STATES PATENTS

| | | |
|---|---|---|
| 47,882 | Turner | May 22, 1865 |
| 379,393 | Harvey | Mar. 13, 1888 |
| 2,094,204 | Carter | Sept. 28, 1937 |
| 2,593,310 | Johnson | Apr. 15, 1952 |
| 2,683,020 | Nickle | July 6, 1954 |
| 2,686,650 | Evans | Aug. 17, 1954 |
| 2,836,387 | Rosebrook | May 27, 1958 |
| 2,838,268 | Ryckman | June 10, 1958 |

FOREIGN PATENTS

| | | |
|---|---|---|
| 873,091 | France | Mar. 2, 1942 |
| 460,166 | Great Britain | Jan. 18, 1937 |
| 548,052 | Great Britain | Sept. 23, 1942 |